United States Patent [19]

Zapolin

[11] Patent Number: 5,122,948
[45] Date of Patent: Jun. 16, 1992

[54] REMOTE TERMINAL INDUSTRIAL CONTROL COMMUNICATION SYSTEM

[75] Inventor: Richard E. Zapolin, Lexington, Mass.

[73] Assignee: Allen-Bradley Company, Inc., Milwaukee, Wis.

[21] Appl. No.: 546,165

[22] Filed: Jun. 28, 1990

[51] Int. Cl.⁵ .......................................... G06F 13/14
[52] U.S. Cl. .................................. 364/131; 364/138; 340/825.07
[58] Field of Search .................... 364/131, 133, 138; 340/825.06, 825.07, 825.44, 870.11, 870.07; 370/60, 92, 94.1

[56] References Cited

U.S. PATENT DOCUMENTS

| | | | |
|---|---|---|---|
| 3,854,122 | 12/1974 | Cross | 340/870.07 |
| 4,287,592 | 9/1981 | Paulish et al. | 370/85.14 |
| 4,319,338 | 3/1982 | Grudowski et al. | 364/900 |
| 4,627,052 | 12/1986 | Hoare et al. | 370/85.13 |
| 4,644,351 | 2/1987 | Zabarsky et al. | 340/825.44 |
| 4,667,323 | 5/1987 | Engdahl et al. | 370/85 |
| 4,747,100 | 5/1988 | Roach et al. | 370/86 |
| 4,831,582 | 5/1989 | Miller et al. | 364/138 |
| 4,858,101 | 8/1989 | Stewart et al. | 364/131 |

OTHER PUBLICATIONS

Bulletin 1710-2.0 operation and installation manual for an Allen-Bradley remote terminal unit dated May 1989.

Primary Examiner—Jerry Smith
Assistant Examiner—Paul Gordon
Attorney, Agent, or Firm—Quarles & Brady

[57] ABSTRACT

An industrial control system has a central processing unit and a plurality of remote terminal units coupled to a communication network. Data is exchanged among the network devices in the form of messages which contain a source address, which designates the network address of the device that sent the message, and a destination address. Each of the remote terminal units stores a first network address assigned to the unit, and second network address corresponding to the network address of the originator of messages to which the remote terminal unit is to respond. The remote terminal unit processes only those messages in which both the destination address matches the first network address and the source address in the message matches the second network address. Thus multiple devices can be assigned the same first network address as long as each such device responds to a different source address. This enables more devices to be coupled to the network than the maximum number of allowable network addresses. Similarly multiple central processing units can be coupled to the network with access to a given remote terminal unit being restricted by the second address to messages originating from only one of the central processing units.

12 Claims, 3 Drawing Sheets

REMOTE TERMINAL UNIT

REMOTE TERMINAL INDUSTRIAL CONTROL COMMUNICATION SYSTEM

BACKGROUND OF THE INVENTION

The present invention relates to apparatus for controlling a large manufacturing or distribution system, and more particularly to apparatus for controlling equipment that is physically separated and connected by a data communication link.

Programmable controllers, such as the one described in U.S. Pat. No. 4,858,101, typically are connected to industrial equipment, such as assembly lines and machine tools within a factory, to sequentially operate the equipment in accordance with a stored control program. The control program is written by the user and includes instructions which are executed to examine the condition of selected sensing devices on the controlled equipment, or to energize or deenergize selected operating devices on the controlled equipment contingent upon the status of one or more of the examined sensing devices.

Many types of sensing devices have been devised for detecting various conditions on the controlled equipment and providing an input signal to the programmable controller. The simplest of these types of devices are switches which send a DC or an AC signal to the programmable controller. Other devices, such as temperature or pressure sensors provide a four to twenty milliampere analog signal having a magnitude which corresponds to the magnitude of the condition being sensed. Similarly with respect to the operating devices, the programmable controller must be capable of providing different levels of DC, AC and analog output signals, for driving a variety of actuators on the controlled equipment.

Since a single programmable controller may control an entire assembly line, different sensing and operating devices may be relatively widely spaced apart. In this case, a central processing unit was placed in a main rack and sensing and operating devices were coupled to that rack. Other sensing and operating devices were connected to remotely located racks which were interfaced the main rack by a communication link. Input/output (I/O) data was exchanged between the racks by the central processing unit addressing each of the remote racks. Only a single central processing unit was connected to an I/O communication link.

As control systems became more complex, multiple programmable controllers were required to govern the operation of large scale systems. The multiple programmable controllers were connected to local area communication networks over which they exchanged data. Each programmable controller was assigned a unique address on the network and responded the messages sent to that address. The number of devices connected to a given local area communication network was limited by the communication protocol employed. The protocol defined the number of addresses that could be used to identify the network devices. If more devices needed to be addressed than the protocol allowed, another communication network had to be established. Although it was possible to create a new protocol with enlarged addressing capability, existing devices which used the original protocol would be incompatible with the new protocol.

It is desirable to apply programmable controllers to very large scale manufacturing and distribution systems, such as oil and gas production networks and utility systems. For example, a gas production system can comprise a large number of unattended wells located over a sizeable geographical area. In these applications, a telephone company or other common carrier provides the communication links between the different locations, instead of local area networks. When common carriers are employed to link devices of a large scale manufacturing and distribution systems, it may be desirable to be able to attach a greater number of devices to the communication link than can be addressed by a conventional protocol. For example, it may be economically desirable to couple the remote locations with a single dedicated telephone network rather than several separate links.

Further some applications may require two or more programmable controllers to access different sensing or operating devices at the same remote location. For example, one programmable controller may operate the well head pump and valves, while another controller gathers data on the volume of gas produced, In this case, it would be more economical to use a single communication link, rather than separate ones for each programmable controller.

SUMMARY OF THE INVENTION

An industrial control system has a central processing unit which executes' a program that governs the operation of equipment connected to the system. A plurality of remote terminal units are coupled to the central processing unit by a communication network over which data is exchanged in the form of messages. Each device (programmable controller or remote terminal unit) on the network is assigned an address. In addition to the data, each message contains a source address, which designates the network address of the device that sent the message, and a destination address.

Each of the remote terminal units has a means which designates a first network address assigned to the unit, and a means which designates a second network address indicating a source of messages to which the remote terminal unit is to respond. When a remote terminal unit receives a message sent over the network, the destination and source addresses in the message are inspected. The remote terminal unit processes only those messages in which both the message destination address matches the first network address assigned to the unit, and the source address in the message matches the second designated address.

Therefore, the same network address may be assigned to several remote terminal units as long as each is designated to respond to a different message source address. Similarly, multiple central processing units may be placed on the network, but only one may access a given remote terminal by designating the network address of a single central processing unit as the second network address in the remote terminal unit.

An object of the present invention is to provide a mechanism by which a greater number of devices may be accessed over a communication network than is permitted by the maximum number of unique addresses that can be used as the destination address in a message.

Another object is to allow a plurality of central processing units to exchange data with remote terminal units over the same network, while restricting access to a given remote terminal to only one of the central processing units.

DETAILED DESCRIPTION OF THE INVENTION

Figure 1:
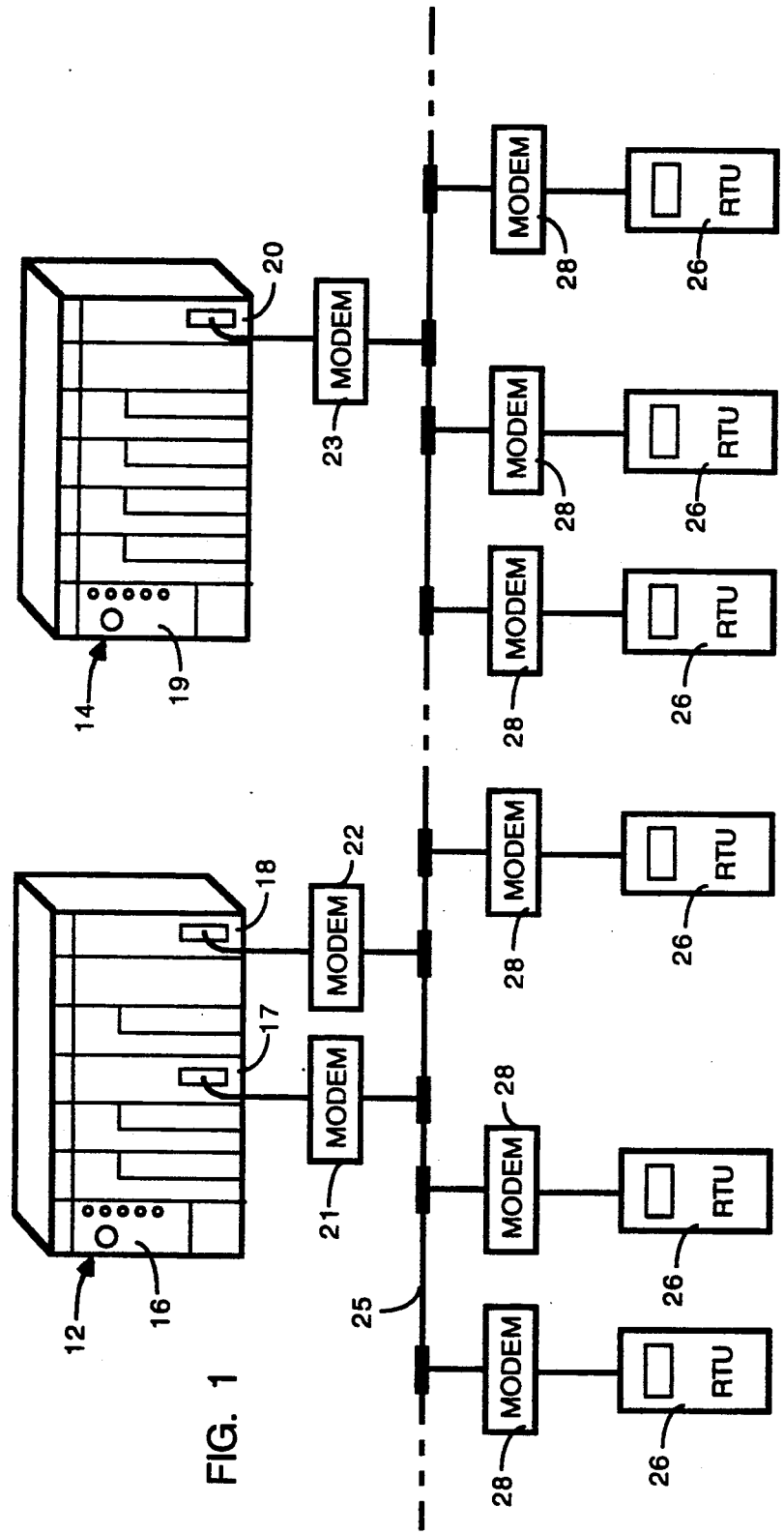
FIG. 1 is a block diagram of an exemplary control system incorporating the present invention.

FIG. 1 illustrates a control system 10 for supervising and governing the operation of a large scale manufacturing or distribution system. For example, the control system 10 will be described in the context of a gas well production and distribution system having a number of gas wells located over a large geographical area supplying gas via a pipeline network to a central processing facility. The exemplary control system 10 includes two programmable controllers 12 and 14. Each programmable controller includes a rack which houses and electrically interconnects a number of functional modules. The first programmable controller 12 includes a central processor module 16 which stores and executes a control program for governing the gas supply system. In addition, the first programmable controller includes a number of functional modules for interfacing the processor module to sensing and actuating devices on the controlled system. Specifically, this programmable controller includes two serial communication modules 17 and 18, which as will be described, exchange commands and data with remote components of the gas supply system. Similarly, the second programmable controller 14 has its own processor module 19 and a plurality of functional modules including a serial communication module 20.

Each of the serial communications modules 17, 18 and 20 is coupled via a separate modem 21, 22, and 23, respectively, to a communication network 25. For example, the communication network 25 may comprise leased telephone lines connected between the different points of the gas supply system at which sensing or activating devices are located. However, the communication network 25, or portions of it, may comprise microwave, radio frequency or other types of transmission links.

The control system 10 also includes a plurality of remote terminal units 26, each coupled to the communication network 25 by a separate modem 28. Although FIG. 1 illustrates a system having only six remote terminal units 26, a large gas supply system will have hundreds of such remote terminal units. One or more remote terminal units will be located at each operating well head and at points along the gas pipeline at which operational parameters are to be sensed or control functions performed. Each remote terminal unit includes a number of input and output ports to which the sensing and operating devices are connected.

Figure 2:
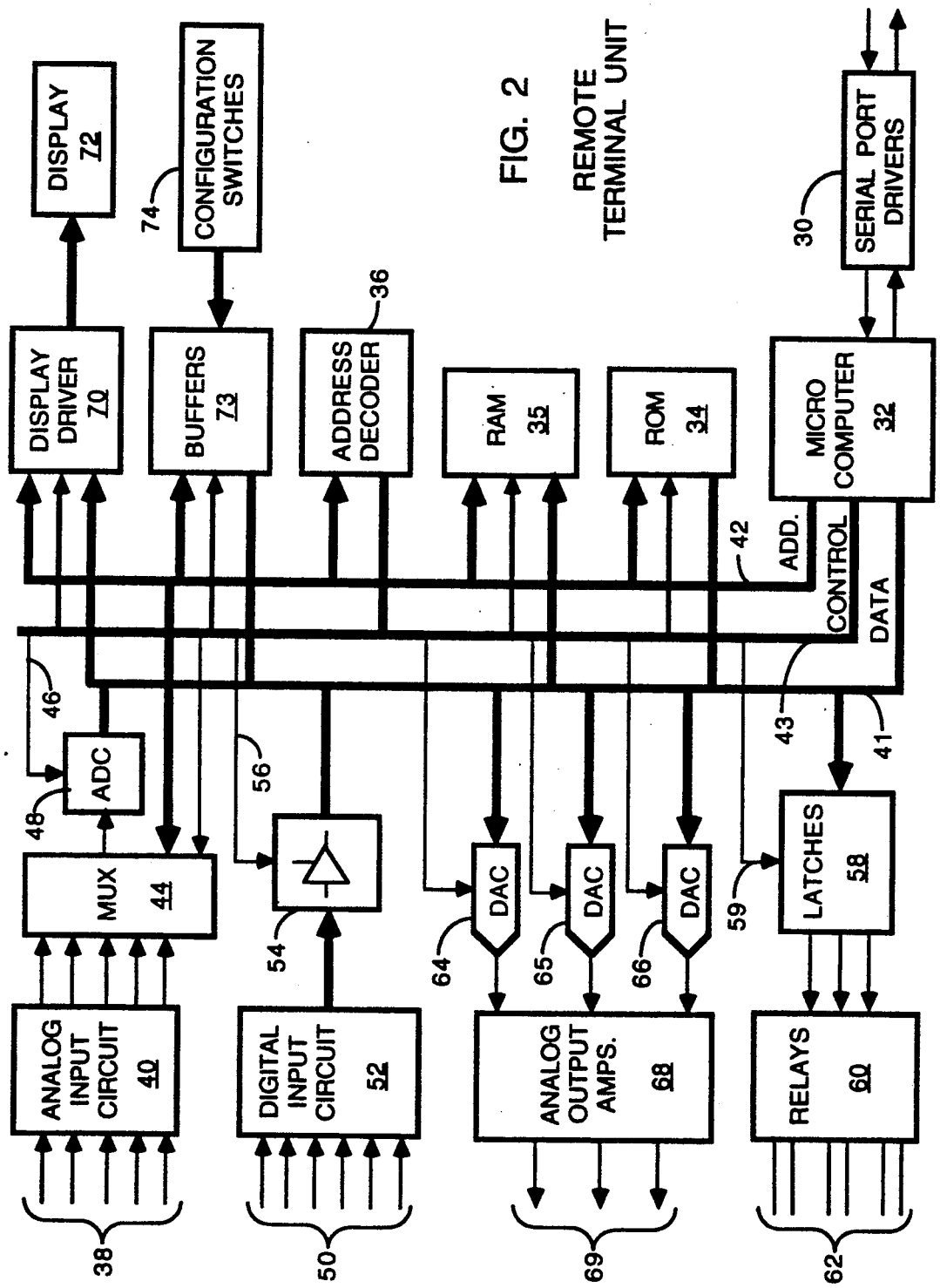
FIG. 2 is a schematic diagram of a remote terminal unit of the control system in FIG. 1.

The internal circuitry and components of a remote terminal unit 26 are shown in FIG. 2. The serial data lines from the modem 28 are coupled to a serial port driver 30 which electrically interfaces the remote terminal unit to the modem 28. The serial port driver 30 is connected to an internal UART within a microcomputer 32. The microcomputer 32 executes a program which controls the operation of the remote terminal unit 26, as will be described subsequently.

The program which is executed by the microcomputer 32 is stored within a read only memory (ROM) 34 coupled to the microcomputer by a set of data, address and control buses 41, 42, and 43, respectively. A random access memory (RAM) 35 is also connected to the buses 41–43 to provide storage locations for the state of sensing and actuating devices connected to the remote terminal unit and other data used by the microcomputer 32. An address decoder 36 responds to signals on the address bus 42 by generating signals on the control bus 42 for the particular component of the remote terminal unit which is being addressed. For example, when data is to be obtained from one of the memories 34 or 35, the address decoder will respond to the addresses on bus 42 by generating control signals which are coupled via the control bus 43 to the memory.

Five analog input lines, collectively designated as 38, are connected to an analog input circuit 40, which includes amplifiers for each of the input lines 38. The amplified signals are coupled to the inputs of a five-to-one multiplexer 44. In response to a multi-bit address received from bus 42, the multiplexer 44 switches one of the five output signals from the analog input circuit 40 to the input of an analog-to-digital converter (ADC) 48. When the analog-to-digital converter 48 is enabled by a control signal on line 46, the digitized representation of the signal from the multiplexer is applied to the data bus 41.

Similarly, six digital input lines 50 are connected to a digital input circuit 52 which produces six output bits that are coupled to a set of tri-state data buffers 54. When the data buffers 54 are enabled by a control signal on line 56 from the control bus 43, the bits from the digital input circuit 52 are applied to the data bus 41.

The data bus 41 also is coupled to a set of latches 58 which store three bits from the data bus 41 when enabled by a control signal on line 59 from control bus 43. The the set of latches 58 produce output signals which are coupled to three relays 60. Each output signal from the set of latches 58 energizes or deenergizes a separate relay which opens and closes contacts connected across three pairs of lines 62. The relay lines 62 are used to operate equipment to which they are coupled. For example at a remote location of the gas supply system, a relay may be used to open or close a valve or operate a pump.

Three digital-to-analog converters (DAC) 64, 65 and 66 also are connected to the data bus 41. Each DAC, when activated by a separate signal from control bus 43, stores the digital number from the data bus 41 and produces an analog output signal corresponding in magnitude to the value of the digital number. The outputs from the three digital-to-analog converters 64–66 are coupled to a set of three analog output amplifiers 68 to produce three analog output signals from the remote terminal unit 26 on lines 69. These analog output signals also are used to control equipment at the remote location.

The three buses 41–43 also connect to a display driver 70 which provides signals to a liquid crystal or light emitting diode display 72. This enables the microcomputer 32 to display status and control information to an operator. A set of data buffers 73 couple the buses 41–43 to sets of configuration switches 74. The setting of each set of switches defines an operating parameter of the remote terminal unit 26. For example one set defines the address of the remote terminal unit 26 on the communication network 25. As the configuration switches act as a memory device, alternatively the configuration settings could be stored in RAM 35, set by jumpers or indicated by equivalent means.

The remote terminal unit 26 shown in FIG. 2 periodically samples the inputs to the analog input circuit 40 and the digital input circuit 52. The input values can be stored in RAM 35 or merely tabulated to produce a count of a predefined event. Thereafter, the remote terminal unit 26 is interrogated by a command from one of the programmable controllers 12 or 14 to transmit the input data over the communication network 25 to that programmable controller. Alternatively, the inputs can be sampled by the remote terminal unit 26 in response to a command sent by a programmable controller. Similarly, one of the programmable controllers 12 or 14 may transmit output state data to the remote terminal unit 26. The microcomputer 32 responds by transferring the received data to the appropriate digital-to-analog converter 64–66 or data latch 58 to alter the state of an actuating device coupled to the remote terminal unit. In this fashion, a remote device, such as a well head pump and valve, can be controlled from a central location by the programmable controller. The remote terminal units 26 can also be programmed to provide a limited degree of independent control of the external equipment. For example, operating parameters may be sensed and the remote terminal unit programmed to shut down the equipment when a hazardous condition occurs.

Figure 3:
FIG. 3 depicts the format of a message which is sent among the components of the control system.

The data exchanged between the programmable controllers 12 and 14 and each of the remote terminal units 26 is in the form of a message which contains routing and control information in addition to the data being exchanged. An exemplary message 80 is depicted in FIG. 3 and comprises a number of fields that contain the different types of information. The first field 81 of the message, as transmitted over the communication network 25, contains preamble and header information. This field enables the devices connected to the communication network to recognize that a message is being transmitted and synchronize its receiver circuitry to the serial transmission.

The second field 82 contains a numerical address of a network device to which the message is destined. For example, this field may be eight bits long, enabling the designation of 256 destination addresses. The second field is referred to herein as containing the "destination address". However, as will be described, several remote terminal units may be assigned the same network address. As a consequence, the destination address field alone does not designate the specific remote terminal unit for which the message is intended. The third field 83 of the message 80 contains a network address designating the device which transmitted the message, i.e. the message source. Preferably the source address field is the same size as the destination address field. When multiple remote terminal units are assigned the same network address, each is designated to respond to a different source address. Thus, the combination of the destination and source addresses specify the particular remote terminal unit 26 for which the message is intended.

The fourth field 84 contains a transaction number which is assigned by the programmable controller 12 or 14 which initiated the message exchange. This transaction number is included in a reply message sent by the destination device so that the programmable controller can identify the original message to which the reply relates. The fifth message field 85 contains the command which the recipient device is to execute. For example, a programmable controller may send a message requesting that a specific remote terminal unit 26 reply by sending its input data back to the message originator. In another case, a programmable controller may transmit a message instructing the setting of a remote terminal unit's outputs according to data that accompanies the message. Field 86 includes any data necessary to execute the command. Depending upon the specific protocol used for the communication, the data field 86 may have a fixed or a variable length. Often in the case of a variable length data field, another field (not shown) may be included in the message packet to provide an indication of the length of the data field. The final data field 87 of the message 80 contains a unique bit pattern, commonly referred to as a trailer, which indicates the end of the message.

As noted before, in large scale systems, such as the exemplary gas supply system, the control system 10 may have to supervise the operation of equipment at hundreds of remote places, such as well heads and distribution control stations. Therefore, while the communication protocol normally limits the number of addressable devices on the network 25 to a fixed number, e.g. 256 (the size of the destination and source address fields of the message), communication may be required to a greater number of devices. Previously, this would have required multiple communication networks to be established so that a greater number of remote terminal units could be connected to a single programmable controller or creating a new protocol with larger address fields.

However with the present system, each remote terminal unit 26 is programmed to respond not merely to a single, unique destination network address, but to a combination of a specific source address and a specific destination address. The configuration switches 74 permits the definition of not only a network address assigned to a particular remote terminal unit, but a particular message source address to which the remote terminal unit will respond. Unlike previous programmable controllers in which each I/O network was associated with a single programmable controller, the present invention also allows multiple programmable controllers to be connected to a single network since a given remote terminal unit will respond only to one of those programmable controllers. Similarly, several remote terminal units may have the same network address on the network since they will respond to messages only addressed to that destination from a specific source. Therefore, as long as the plurality of remote terminal units having the same network address each respond to a different source address, there will not be a conflict in communication. This feature permits a greater number of devices to be coupled to a single network than if just the destination address of each message was used to identify the recipient.

The aspects of the present invention will be described in the context of the exchange of exemplary command and response messages between two devices on the communication network 25. When a message is sent by one of the programmable controllers 12 or 14, each of the other modems 21, 22, 23 and 28 detects the electrical signals generated by the message transmission. When the signals are detected, the modems synchronize to the preamble and header field 81 of the message 80 as shown in FIG. 3 and pass the bit patterns of the message to the associated remote terminal unit or programmable controller.

Figure 4:
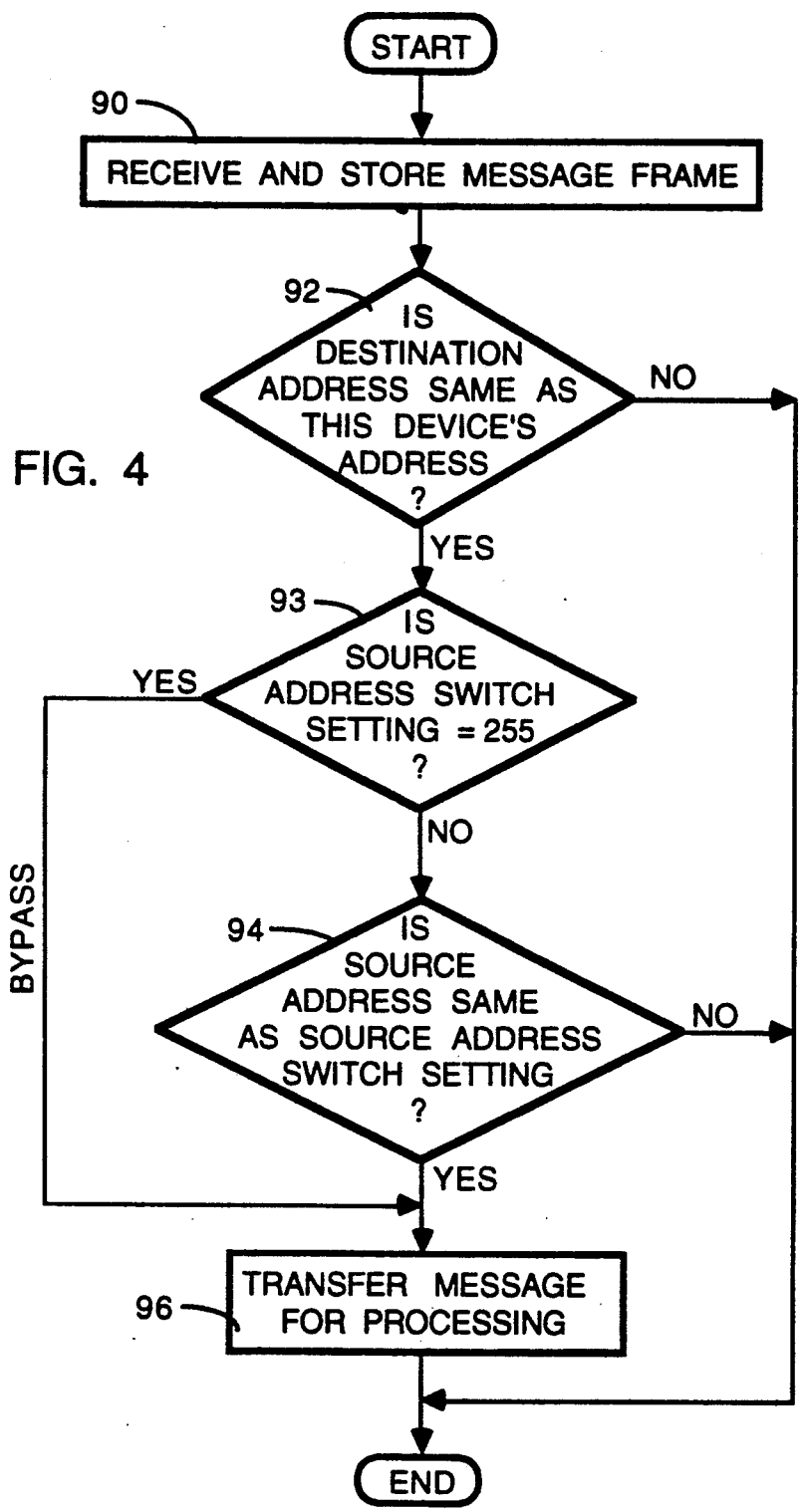
FIG. 4 is a flowchart of communication message handling software for the remote terminal unit.

In the case of a remote terminal unit 26, when a signal is received from their corresponding modem 28, the microcomputer 32 begins executing a message inspection routine stored within ROM 34 and which is depicted by the flowchart of FIG. 4. The first step 90 of this software routine stores the message within RAM 35. After the entire message has been received and stored, the microcomputer 32 reads the set of configuration switches 74 which provides a number designating the network address for that remote terminal unit at step 92. This numerical value is compared to the destination address contained within field 82 of the received message. If the two numbers do not match, that is the message is not for that remote terminal unit, the message inspection routine ends with no further action being taken.

A numerical match found at step 92 indicates that the message is destined for a device having the same network address as the present remote terminal unit, the program execution advances to step 93. At this juncture, the microcomputer 32 reads another set of the configuration switches 74 which designate the address of the source of messages to which the present remote terminal unit 26 is to respond. At step 93 the setting of the source address switches is compared to a given number (e.g. 255). The setting of these switches to this number indicates that the remote terminal unit should process any message with the designated destination address regardless of the source address in the message. This bypass feature permits the remote terminal unit to act as a conventional network device. Step 93 is optional and may be eliminated in devices which will not be used in applications where they will have to act as conventional devices. The remainder of this description assumes that the source address switch setting does not equal 255.

Therefore, the program execution advances to step 94. The configuration switch setting number is compared to the source address designated in field 83 of the message to determine whether the present message is from the proper source device. If the source addresses do not match, that is the message was sent by the incorrect source and is intended for another remote terminal unit 26 having the same network address, the message inspection routine terminates without further processing of the newly received message. Any subsequently received message will be written over the current message within RAM 35.

However, if both the destination address and the source address in the received message are identical, the program execution advances to step 96 where the message is transferred within RAM 35. The message is placed in another storage location for further processing by a message handling routine which responds to the command contained within field 85 of the message. This transfer frees the original storage location for the receipt of another message from the communication network. Thus a received message is accepted for processing by a given remote terminal unit 26 only if the destination and source addresses contained in the message match the destination and source addresses set by its configuration switches 74.

If a response to the message is required, the remote terminal unit will formulate a message 80 similar to that shown in FIG. 3. However, the source address in the received message is placed within the destination address field 82 of the reply message so that the reply will go to the communication module 17, 18 or 20 of the programmable controller that sent the original message. In addition, the remote terminal unit's network address, as set by the configuration switches 74, is placed within field 83 of the reply. The command field 85 is altered to indicate that it is a reply message and the data being transferred is placed into field 86. The transaction number contained within field 84 remains the same so that the programmable controller 12 or 14 which issued the command can determine to which of possibly several messages the reply relates. The reply message then is transmitted over the network by the microcomputer sending the data in serial fashion through its on chip UART to the serial port drivers 30 and the associated modem 28. Since the communication modules 17, 18 and 20 receive messages from many remote terminal units, each module must be assigned a unique network address to insure that the reply message is properly received.

It should be noted that the first programmable controller 12 has two serial communication modules 17 and 18 and separate modems 21 and 22 connected to each of those modules. Alternatively, a single communication module may be used in the first programmable controller 12, if that module is capable of acting as two different addressable devices on the network 25. This enables the first programmable controller 12 to have two addresses on the network allowing the addressing of more remote terminal units 26 than the maximum number permitted by the size of the destination address field 83 o the message protocol. If the maximum number of network addresses definable by the message destination field 83 is M, the first programmable controller 12 can address almost two times M remote terminal units. Each communication module 17 and 18 can address a different group of M-N remote terminal units, where N is the number of programmable controller communication modules which must have unique network addresses. In the exemplary network of FIG. 1, N equals three for communication modules 17, 18 and 20. Note that one additional network address may have to be reserved to implement the bypass feature described with respect to step 93.

As a result, the network addresses assigned to remote terminal units in one group can duplicate addresses assigned to remote terminal units in the other group, as long as each group is set to respond to the unique source address assigned to a different communication module 17 or 18 of the first programmable controller 12. For example, two remote terminal units can both be assigned network address 130 as long as each is set to respond to messages from a different communication module, i.e. a different source address. This allows a single communication network to be extended throughout a large scale control network, such as an entire oil field, rather than utilizing a plurality of networks which may be more costly and less efficient.

Similarly, a third group of remote terminal units 26 may be placed on the same communication network 25 and set to respond to a third source address assigned to the communication module 20 within the second programmable controller 14. The present communication technique also allows two programmable controllers to exchange input/output data over the same network with their own groups of remote terminal units. Since each remote terminal unit responds to messages which contain both the predefined destination address and the predefined source address, only one programmable controller can alter the state of a given remote terminal unit.

Previously, it was not advisable to place multiple programmable controllers on the same I/O network, since each remote terminal unit responded to any message with its network address in the destination field 82. In which case, a given remote terminal unit could respond to messages from each of the programmable controllers connected to the I/O communication network. If the operator of the system erroneously programmed several of the programmable controllers to communicate with the same remote terminal unit, one of the programmable controllers might perform its control operation under the misconception that the remote terminal unit was in a given state whereas the state was changed by a message sent from another programmable controller. This could have disastrous consequences with respect to the safe operation of the equipment being controlled.

Although the present invention has been described in the context of an industrial control system having programmable controllers and a specific type of remote terminal units, the inventive concept is not limited solely to this exemplary system. Other types of central processors can be used in place of the ones of the programmable controllers. Similarly, the remote terminal units can comprise other kinds of devices for interfacing to the sensing and actuating devices. A remote terminal unit can even be a programmable controller under the supervision of the central processor.

I claim:

1. An industrial control system comprising:
    a communication network over which messages are exchanged between devices connected to the network, wherein each message contains a source address indicating the device from which the message originated and a destination address;
    a central processor which executes a control program to operate equipment connected to the industrial control system;
    means for coupling said central processor to said communication network for the exchange of messages over the network; and
    a plurality of remote terminal units for exchanging messages with said central processor, each of said remote terminal units comprising:
        a) means, coupled to said communication network, for receiving messages,
        b) means for storing a first address and a second address,
        c) a first means for comparing the first address to the destination address contained in a message received from said communication network and producing a first indicia that the addresses are the same,
        d) a second means for comparing the second address to the source address contained in the message received from said communication network and producing a second indicia that the addresses compared by said second means are the same,
        e) means for responding to the received message in response to the presence of both the first and second indicia, and
        f) an interface for exchanging control data with the equipment, an exchange of data being in response to said means for responding to the received message.

2. The industrial control system as recited in claim 1 wherein each message may contains one of M the destination addresses where M is an integer, and said plurality of remote terminal units exceeds M in number.

3. The industrial control system as recited in claim 2 wherein said central processor includes means for transmitting messages over said communication network using two source addresses in which each transmitted message contains one of the two source addresses selected by the central processor depending upon which of the remote terminal units is to receive the message.

4. An industrial control system comprising:
    a communication network over which messages are exchanged between devices connected to the network with each device being assigned a network address, wherein each message contains a source address indicating the device from which the message originated and a destination address;
    a plurality of central processors each of which including means, coupled to said communication network, for the exchange of messages over the network, each of said central processors being assigned a unique address on said communication network; and
    a plurality of remote terminal units for exchanging messages with said central processor, each of said remote terminal units comprising:
        a) means, coupled to said communication network, for receiving messages,
        b) means for storing a first address and a second address;
        c) a first means for comparing the first address to the destination address contained in a message received from said communication network and producing a first indicia that the compared addresses are the same,
        d) a second means for comparing the second address to the source address contained in the message received from said communication network and producing a second indicia that the addresses compared by said second means are the same, and
        e) means for responding to the received message in response to the presence of both the first and second indicia.

5. The industrial control system as recited in claim 4 wherein said plurality of remote terminal units is divided into at least two groups with the network address of one of the central processors being stored stored as the second address in the remote terminal units in one group, and the network address of another of the central processors being stored stored as the second address in the remote terminal units in the other group.

6. A remote terminal unit, for an industrial control system that includes a communication network for the exchange of messages in which each message contains a destination address and a source address, a central processor which executes a control program to operate equipment connected to the industrial control system and which is coupled to the communication network, wherein the remote terminal unit comprises:
    means, coupled to said communication network, for receiving messages from the central processor;
    means for storing a first address and a second address;
    a first means for comparing the first address to the destination address contained in a message received from said communication network and producing a first indicia that the compared addresses are the same;

a second means for comparing the second address to the source address contained in the message received from said communication network and producing a second indicia that the addresses compared by said second means are the same; and means for responding to the received message in response to the presence of both the first and second indicia.

7. The remote terminal unit as recited in claim 6 wherein said means for responding executes a command contained in the the received message.

8. The remote terminal unit as recited in claim 6 further comprising means for receiving data from external input devices.

9. The remote terminal unit as recited in claim 6 further comprising means for controlling external devices in response to a message received from said communication network.

10. The remote terminal unit as recited in claim 6 further comprising means for receiving data from external input devices; and means for controlling external devices in response to a message received from said communication network.

11. The remote terminal unit as recited in claim 6 wherein said means for responding comprises:

means for coupling an analog signal from an external device to the remote terminal unit;

means for coupling a digital signal from an external device to the remote terminal unit;

means for sending an analog signal to an external device; and means for sending a digital signal to an external device.

12. The remote terminal unit as recited in claim 6 wherein said means for responding includes a selectively activated bypass means which enables a response to the received message to be carried out when only the first indicia is present.

* * * * *